(12) United States Patent
Lee

(10) Patent No.: US 10,707,013 B2
(45) Date of Patent: Jul. 7, 2020

(54) SHEET FOR SHIELDING ELECTROMAGNETIC WAVES FOR WIRELESS CHARGING AND METHOD OF MANUFACTURING THE SAME

(71) Applicant: Samsung Electro-Mechanics Co., Ltd., Suwon-si (KR)

(72) Inventor: Seung Min Lee, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 347 days.

(21) Appl. No.: 15/708,884

(22) Filed: Sep. 19, 2017

(65) Prior Publication Data

US 2018/0211767 A1  Jul. 26, 2018

(30) Foreign Application Priority Data

Jan. 25, 2017 (KR) .......................... 10-2017-0011708

(51) Int. Cl.
*H01F 27/36* (2006.01)
*H01F 27/28* (2006.01)
(Continued)

(52) U.S. Cl.
CPC ......... *H01F 27/365* (2013.01); *B29B 13/022* (2013.01); *B29C 45/0001* (2013.01); *B29C 45/0013* (2013.01); *B29C 45/0053* (2013.01); *H01F 27/2885* (2013.01); *H01F 38/14* (2013.01); *H02J 7/025* (2013.01);
(Continued)

(58) Field of Classification Search
CPC .... H01F 27/365; H01F 27/2885; H01F 38/14; H01F 3/10; H02J 7/025; B29C 45/0001; B29C 2045/0015; B29C 45/0013; B29C 45/0053; B29B 13/022; B29B 7/90; B29K 2105/251; B29K 2505/00; B29K 2995/0008; B29L 2007/002; H05K 9/0075

See application file for complete search history.

(56) References Cited

U.S. PATENT DOCUMENTS 10,010,018 B2 * 6/2018 Lee .......................... H02J 50/70
10,398,067 B2 * 8/2019 Lee .......................... H02J 7/025
(Continued)

FOREIGN PATENT DOCUMENTS

| CN | 104011814 A | 8/2014 |
|---|---|---|
| CN | 105189621 A | 12/2015 |
| CN | 207800345 U | 8/2018 |
| KR | 10-1178874 B1 | 9/2012 |
| KR | 10-2015-0050541 A | 5/2015 |
| KR | 10-2016-0028384 A | 3/2016 |
| WO | WO 2014/140982 A1 | 9/2014 |

OTHER PUBLICATIONS

Chinese Office Action dated Aug. 30, 2019 in counterpart Chinese Patent Application No. 201711192724.0 (11pages in English and 6 pages in Chinese).

*Primary Examiner* — Jared Fureman
*Assistant Examiner* — Emmanuel Dominique
(74) *Attorney, Agent, or Firm* — NSIP Law

(57) ABSTRACT

A sheet to shield electromagnetic waves for wireless charging includes: a base part formed of a resin; and a magnetic material embedded in the base part, wherein a density of the magnetic material in a region of the magnetic material corresponding to a shape of a coil of a reception coil member or a transmission coil member and a region of the magnetic material corresponding to an inner side of the coil is higher than a density of the magnetic material in other regions of the magnetic material.

11 Claims, 6 Drawing Sheets

(51) Int. Cl.
*H02J 50/10* (2016.01)
*H02J 7/02* (2016.01)
*H01F 38/14* (2006.01)
*H02J 50/70* (2016.01)
*B29C 45/00* (2006.01)
*B29B 13/02* (2006.01)
*B29B 7/90* (2006.01)
*B29K 105/00* (2006.01)
*B29K 505/00* (2006.01)
*B29L 7/00* (2006.01)

(52) U.S. Cl.
CPC ............ *H02J 50/10* (2016.02); *H02J 50/70* (2016.02); *B29B 7/90* (2013.01); *B29C 2045/0015* (2013.01); *B29K 2105/251* (2013.01); *B29K 2505/00* (2013.01); *B29K 2995/0008* (2013.01); *B29L 2007/002* (2013.01)

(56) References Cited

U.S. PATENT DOCUMENTS

| | | | |
|---|---|---|---|
| 2012/0098352 A1* | 4/2012 | Takaishi | H02J 50/70 307/104 |
| 2012/0112552 A1* | 5/2012 | Baarman | H01F 27/362 307/104 |
| 2012/0156398 A1 | 6/2012 | Kim | |
| 2012/0235500 A1* | 9/2012 | Ganem | H03H 7/40 307/104 |
| 2014/0320369 A1* | 10/2014 | Azenui | H01Q 7/00 343/841 |
| 2015/0123604 A1* | 5/2015 | Lee | B32B 38/0004 320/108 |
| 2016/0064814 A1 | 3/2016 | Jang et al. | |
| 2018/0198310 A1* | 7/2018 | Hwang | H05K 7/20472 |
| 2018/0211767 A1 | 7/2018 | Lee | |
| 2018/0323494 A1* | 11/2018 | Seong | H01F 1/37 |

\* cited by examiner

SHEET FOR SHIELDING ELECTROMAGNETIC WAVES FOR WIRELESS CHARGING AND METHOD OF MANUFACTURING THE SAME

CROSS-REFERENCE TO RELATED APPLICATIONS

This application claims the benefit under 35 U.S.C. § 119(a) of Korean Patent Application No. 10-2017-0011708 filed on Jan. 25, 2017 in the Korean Intellectual Property Office, the entire disclosure of which is incorporated herein by reference for all purposes.

BACKGROUND

1. Field

The following description relates to a sheet for shielding electromagnetic waves for wireless charging, and a method of manufacturing a sheet for shielding electromagnetic waves for wireless charging.

2. Description of Related Art

A sheet for shielding electromagnetic waves for wireless charging is used as a component for efficiently transmitting electromagnetic waves generated in a transmission portion Tx to a reception portion Rx and preventing the electromagnetic waves from leaking to locations (for example, a battery) other than the reception portion at the time of wirelessly charging a portable terminal with power.

The sheet for shielding electromagnetic waves may be formed of various materials, and contains, for example, a metal ribbon and a magnetic material of which magnetic permeability needs to be adjusted.

In addition, in order to further improve performance or form a structural feature portion in a stereoscopic shape, materials such as powder particles and flakes are mixed with a resin, for example, to form the stereoscopic shape. In the related art, the powder particles and the flakes are randomly disposed in an entire shape.

A structure capable of further improving shielding efficiency of a magnetic field needs to be developed.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a sheet to shield electromagnetic waves for wireless charging includes: a base part; and a magnetic material embedded in the base part, wherein a density of the magnetic material in a region of the magnetic material corresponding to a shape of a coil of a reception coil member or a transmission coil member and a region of the magnetic material corresponding to an inner side of the coil is higher than a density of the magnetic material in other regions of the magnetic material.

The coil may have a spiral shape, and a density of the magnetic material in a region of the magnetic material corresponding to a through-hole of the coil may be higher than a density of the magnetic material in other regions of the magnetic material.

The coil may have a spiral shape, and the density of the magnetic material in the region of the magnetic material corresponding to the shape of the coil may be higher than a density of the magnetic material in a region of the magnetic material disposed outside the coil.

The coil may have a spiral shape, and a density of the magnetic material in a thickness direction of the base part may vary in the region of the magnetic material corresponding to the shape of the coil.

A density of the magnetic material in a region of the magnetic material disposed in an upper portion of the base part disposed adjacent to the coil in the thickness direction of the base part may be higher than a density of the magnetic material in a region of the magnetic material disposed at a lower portion of the base part.

A density of the magnetic material in a region of the magnetic material corresponding to a region between coil patterns of the coil may be lower than a density of the magnetic material in regions of the magnetic material corresponding to the coil patterns.

A disposition shape of the magnetic material may be formed based on magnetic fluxes of magnets disposed in a mold at a time of manufacturing the magnetic material.

The sheet may further include an adhesive layer disposed on one surface of the base part.

The magnetic material may include either one or both of a powder form and a flake form.

In another general aspect, a method to manufacture a sheet for shielding electromagnetic waves for wireless charging includes: mixing resin powder particles with a magnetic material to form a mixture; melting the mixture; injecting the melted mixture into a mold; and adjusting a density of the magnetic material by forming a magnetic field through a magnet installed in the mold to change a position of the magnetic material.

The magnetic material may include either one or both of a powder form and a flake form.

A density of the magnetic material in a region of the magnetic material corresponding to a shape of a coil of a reception coil member or a transmission coil member and a region of the magnetic material corresponding to an inner side of the coil may be higher than a density of the magnetic material in other regions of the magnetic material.

The coil may have a spiral shape, and a density of the magnetic material in a region of the magnetic material disposed to correspond to a through-hole of the coil may be higher than a density of the magnetic material in other regions of the magnetic material.

The coil may have a spiral shape, and the density of the magnetic material in the region of the magnetic material corresponding to the shape of the coil may be higher than a density of the magnetic material in a region of the magnetic material disposed outside the coil.

A density of the magnetic material in a region of the magnetic material disposed in an upper portion of a base part disposed adjacent to the coil in a thickness direction of the base part may be higher than a density of the magnetic material in a region of the magnetic material disposed at a lower portion of the base part.

A density of the magnetic material in a region of the magnetic material corresponding to a region between coil patterns of the coil may be lower than a density of the magnetic material in regions of the magnetic material corresponding to the coil patterns.

In another general aspect, a wireless power reception apparatus includes: a base part; a wireless power reception coil; and a magnetic material embedded in the base part, wherein a density of the magnetic material in a region of the magnetic material corresponding to a shape of the wireless power reception coil and a region of the magnetic material corresponding to an inner side of the wireless power reception coil is higher than a density of the magnetic material in other regions of the magnetic material.

The wireless power reception coil may have a spiral shape, and a density of the magnetic material in a region of the magnetic material corresponding to a through-hole of the wireless power reception coil may be higher than a density of the magnetic material in other regions of the magnetic material.

The wireless power reception coil may have a spiral shape, and the density of the magnetic material in the region of the magnetic material corresponding to the shape of the wireless power reception coil is higher than a density of the magnetic material in a region of the magnetic material disposed outside the wireless power reception coil.

The wireless power reception coil may have a spiral shape, and a density of the magnetic material in a region of the magnetic material disposed in an upper portion of the base part disposed adjacent to the wireless power reception coil in a thickness direction of the base part is higher than a density of the magnetic material in a region of the magnetic material disposed at a lower portion of the base part.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
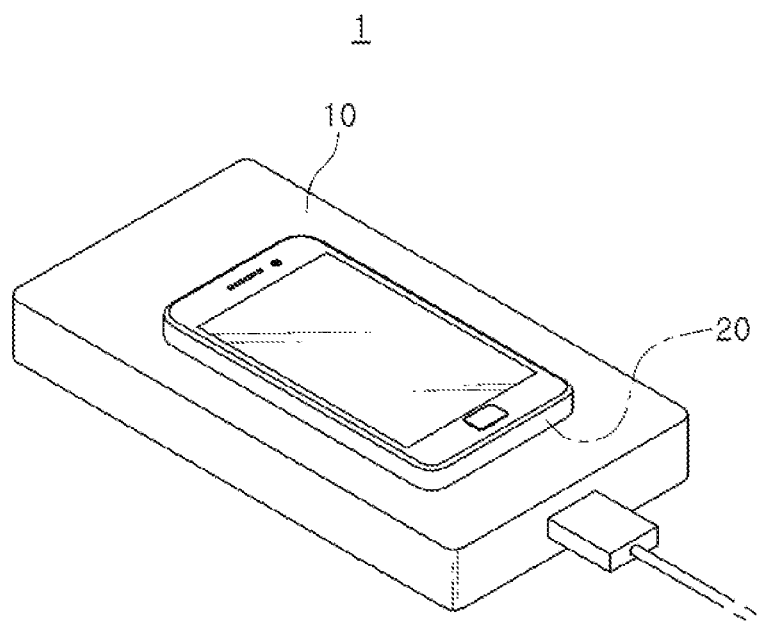
FIG. 1 is a perspective view illustrating an appearance of a wireless charging system.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," "coupled to," "over," or "covering" another element, it may be directly "on," "connected to," "coupled to," "over," or "covering" the other element, or there may be one or more other elements intervening therebetween. In contrast, when an element is described as being "directly on," "directly connected to," "directly coupled to," "directly over," or "directly covering" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

Hereinafter, embodiments will be described in detail with reference to the accompanying drawings.

Figure 2:
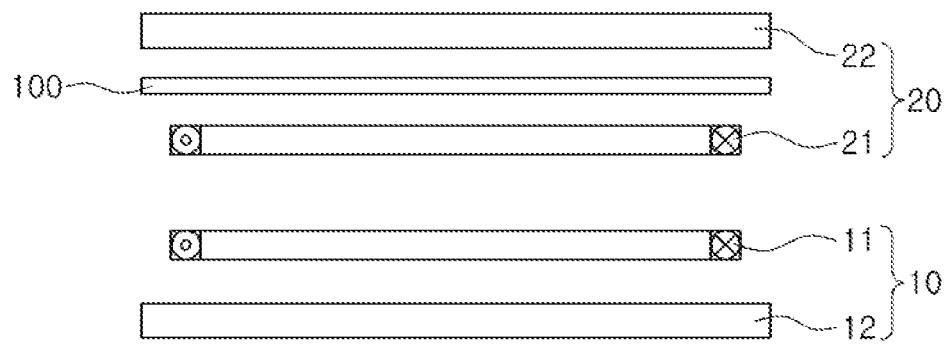
FIG. 2 is an exploded cross-sectional view illustrating main internal components of the wireless charging system of FIG. 1.

FIG. 1 is a perspective view illustrating an appearance of a wireless charging system 1. FIG. 2 is an exploded cross-sectional view illustrating main internal components of the wireless charging system 1.

Referring to FIGS. 1 and 2, the wireless charging system 1 includes a wireless power transmission apparatus 10 and a wireless power reception apparatus 20.

The wireless power transmission apparatus 10 is an apparatus that generates a magnetic field in the vicinity thereof. The wireless power reception apparatus 20 is charged with power in a magnetic induction manner through the magnetic field, and may be implemented in various types of electronic devices such as a cellular phone, a laptop computer, or a tablet personal computer (PC).

Referring to FIG. 2, the wireless power transmission apparatus 10 includes a transmission coil member 11 formed on a substrate 12. Therefore, when an alternating current (AC) voltage is applied to the wireless power transmission apparatus 10, the magnetic field is formed in the vicinity of the wireless power transmission apparatus 10. Therefore, electromotive force induced from the transmission coil member 11 is generated in a reception coil member 21 embedded in the wireless power reception apparatus 20, such that a battery 22 may be charged.

The battery 22 may be a nickel metal hydride battery or a lithium ion battery that is rechargeable, but the battery 22 is not particularly limited to these examples. In addition, the battery 22 may be formed to be physically separate from the wireless power reception apparatus 20 to therefore be implemented in a detachable form in which the battery 22 is detachable from the wireless power reception apparatus 20. Alternatively, the battery 22 may be implemented in integral form in which it is configured integrally with the wireless power reception apparatus 20.

The transmission coil member 11 and the reception coil member 21, which are configured to be electromagnetically coupled to each other, are formed by winding a metal wire formed of copper, for example, and may have a wound shape such as a circular shape, an oval shape, a quadrangular shape, or a rhombic shape. Additionally, the total sizes and the number of turns, or the like, of the transmission coil member 11 and the reception coil member 21 may be appropriately controlled and set depending on demanded properties.

A sheet 100 (hereinafter, "shielding sheet") for shielding electromagnetic waves for wireless charging is disposed between the reception coil member 21 and the battery 22. The shielding sheet 100 blocks a magnetic field generated in the reception coil member 21 from arriving at the battery 22.

Figure 3:
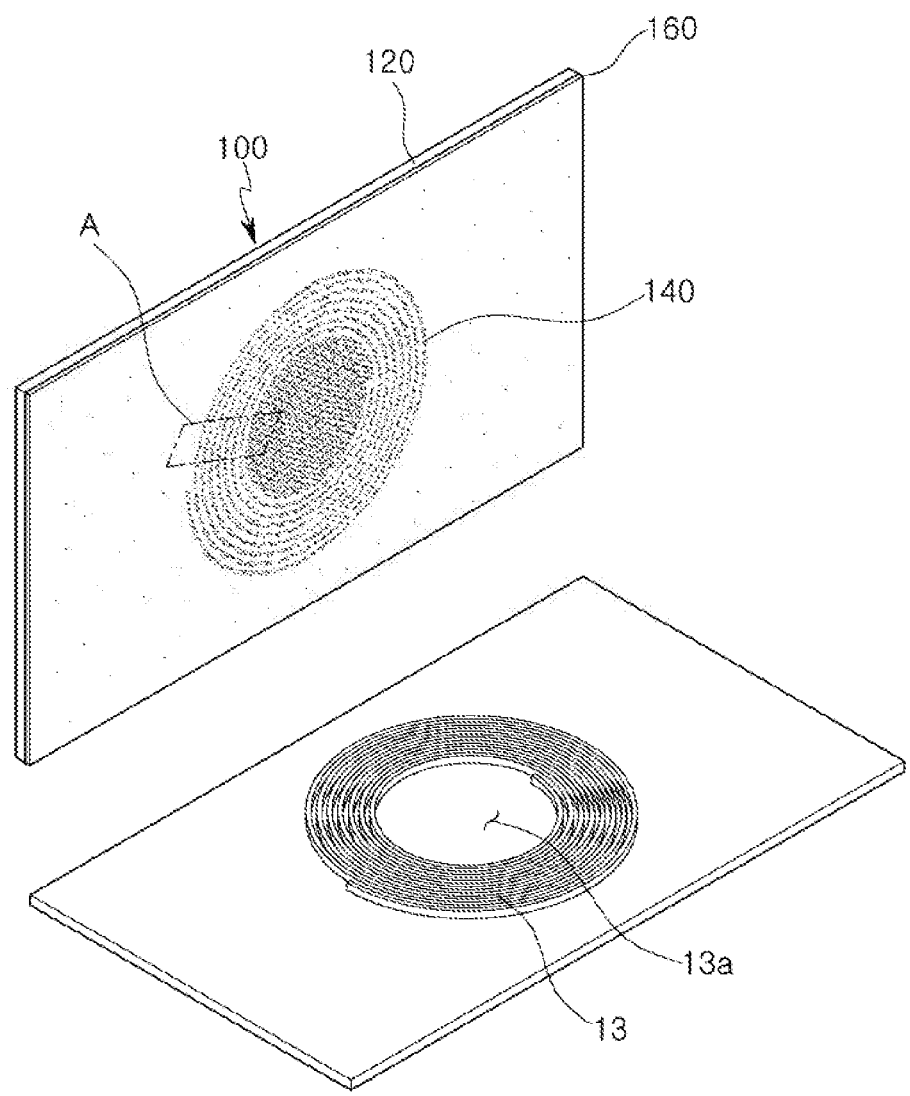
FIG. 3 is a configuration diagram illustrating a sheet for shielding electromagnetic waves for wireless charging, according to an embodiment.
Figure 4:
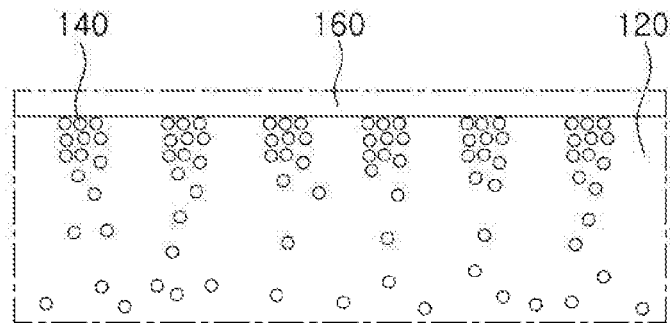
FIG. 4 is a schematic cross-sectional view illustrating a cross-section of part A of FIG. 3.

FIG. 3 is a configuration diagram illustrating the shielding sheet 100, according to an embodiment. FIG. 3 is a schematic view illustrating components in order to describe a technical feature of the disclosure. FIG. 4 is a schematic cross-sectional view illustrating a cross-section of part A of FIG. 3.

Referring to FIGS. 3 and 4, the shielding sheet 100 includes, for example, a base part 120, a magnetic material 140, and an adhesive layer 160.

The base part 120 may be formed of a resin. The base part 120 has a size sufficient to cover the reception coil member 21 and the transmission coil member 11, and may have a size greater than sizes of the reception coil member 21 and the transmission coil member 11.

The magnetic material 140 is embedded in the base part 120. As an example, the magnetic material 140 has either one or both of a powder form and a flake form.

In addition, the magnetic material 140 is, for example, an Fe-based or Co-based magnetic alloy. For example, an Fe—Si—B alloy is used as the Fe-based magnetic alloy, and, as a content of metal including Fe in the Fe—Si—B alloy increases, a saturation magnetic flux density also increases. However, in a case in which a content of Fe elements is excessive, it is difficult to form an amorphous alloy. Therefore, a content of Fe is, for example, 70 to 90 atomic %, and when the sum of contents of Si and B is in a range of 10 to 30 atomic %, the capability of forming an amorphous alloy is excellent. 20 atomic % or less of a corrosion resistant element such as Cr or Co is added to the aforementioned basic composition in order to prevent corrosion, and a small amount of other metal elements may be added to such a basic composition, if necessary, in order to provide other characteristics.

The magnetic alloy may be an Fe-based nanocrystalline magnetic alloy. The Fe-based nanocrystalline magnetic alloy may be An Fe—Si—B—Cu—Nb alloy.

Referring to FIGS. 3 and 4, a density of the magnetic material 140 in a region corresponding to a shape of a coil 13 of the reception coil member 21 (see FIG. 2) or the transmission coil member 11 (see FIG. 2) described above and a region corresponding to an inner side of the coil 13 is higher than a density of the magnetic material 140 in other regions. In this disclosure "a region corresponding to a shape of a coil 13" refers to a region of the magnetic material that is aligned with a region occupied by the coil, and has a shape similar to or substantially the same as a shape of the coil 13. "A region corresponding to an inner side of the coil 13" refers to a region of the magnetic material 140 that is aligned with the inner side of the coil 13.

In addition, the coil 13 has a spiral shape, and a density of the magnetic material 140 in a region disposed to correspond to a through-hole 13a of the coil 13 is higher than a density of the magnetic material 140 in other regions.

In addition, as an example, the coil 13 has a circular spiral shape, and a density of the magnetic material 140 in a region corresponding to the shape of the coil 13 is higher than a density of the magnetic material 140 in a region disposed outside of the coil 13.

Further, as shown in FIG. 4, there is a difference in a density of the magnetic material 140 in a thickness direction of the base part 120 in the region corresponding to the shape of the coil 13. As an example, a density of the magnetic material 140 is higher in a region disposed in an upper portion of the base part 120 disposed adjacent to the coil 13 in the thickness direction of the base part 120 than in a region disposed at a lower portion of the base part 120.

In addition, as shown in FIGS. 3 and 4, a density of the magnetic material 140 in a region corresponding to a region between coil patterns of the coil 13 may be lower than a density of the magnetic material 140 in regions corresponding to the coil patterns of the coil 13.

Further, a disposition shape of the magnetic material 140 is formed depending on magnetic fluxes of magnets disposed in a mold at the time of manufacturing the magnetic material 140. That is, the disposition shape of the magnetic material 140 may be freely changed by changing positions of the magnets disposed in the mold, the number of magnets, a disposition of the same poles (for example, an N pole and an N pole), a disposition of different poles (for example, an N pole and an S pole), and a magnitude of magnetic force, to change densities of the magnetic fluxes.

The adhesive layer 160 is formed on one surface of the base part 120. As an example, the adhesive layer 160 is formed of a generally used adhesive material, for example, a known resin composition, and is formed of a material physically coupled to the base part 120 and forming a chemical bond with the base part 120.

As described above, the density of the magnetic material 140 is changed depending on the shape of the coil 13 to improve shielding efficiency of the magnetic field.

Figure 5:
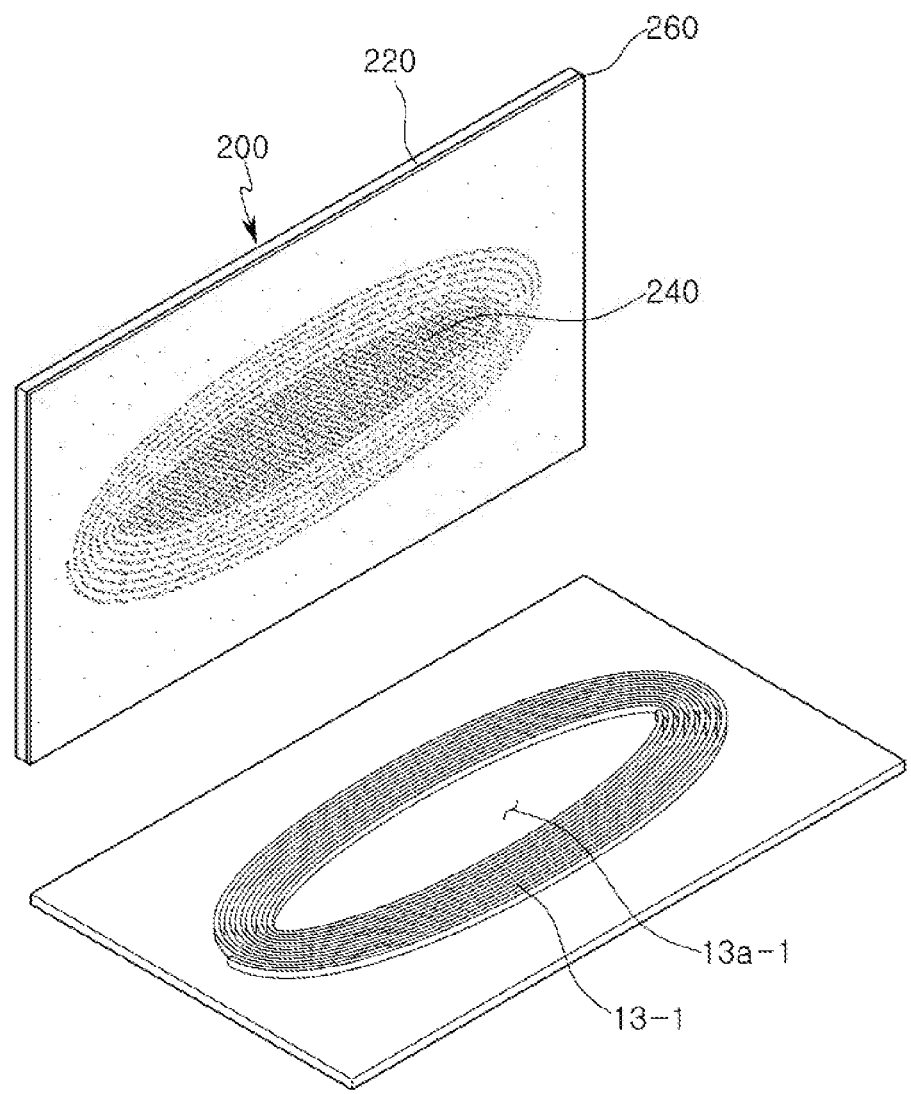
FIGS. 5 through 7 are schematic configuration diagrams illustrating sheets for shielding electromagnetic waves for wireless charging, according to other embodiments.
Figure 6:
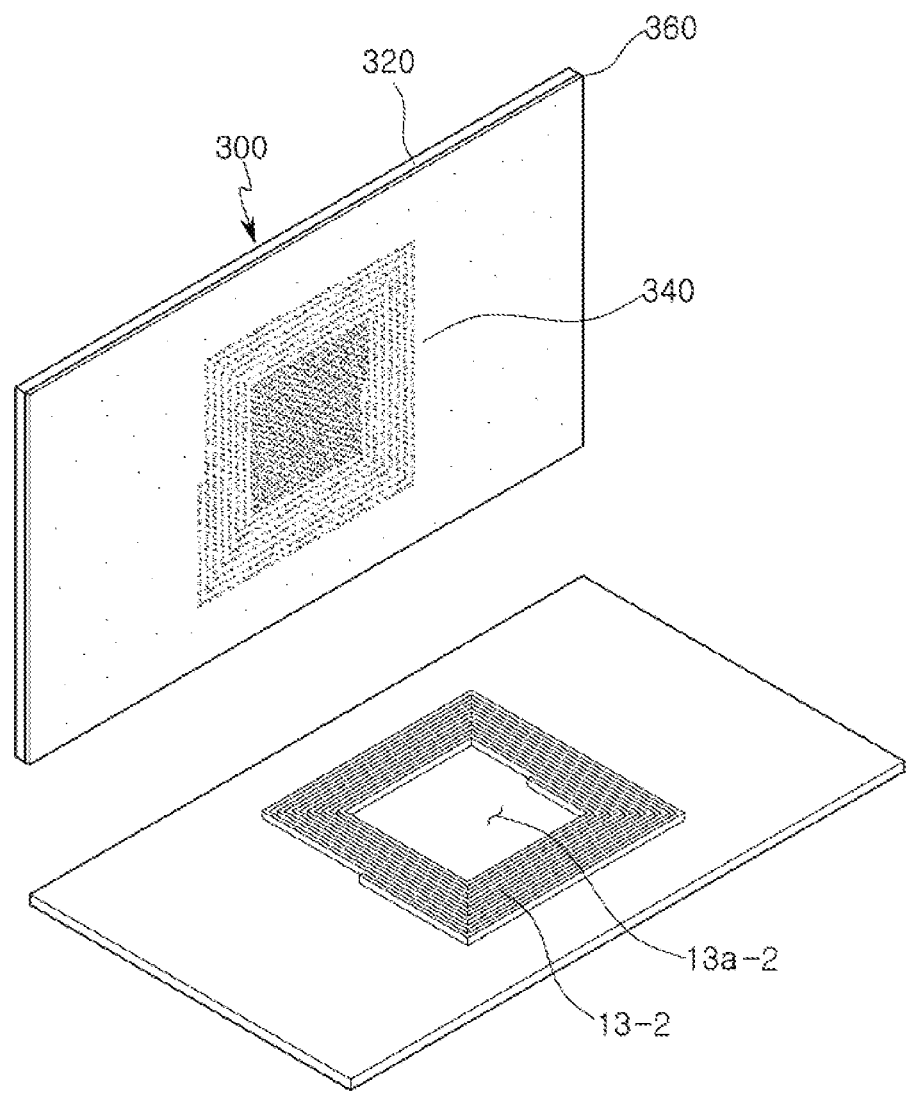
Figure 7:
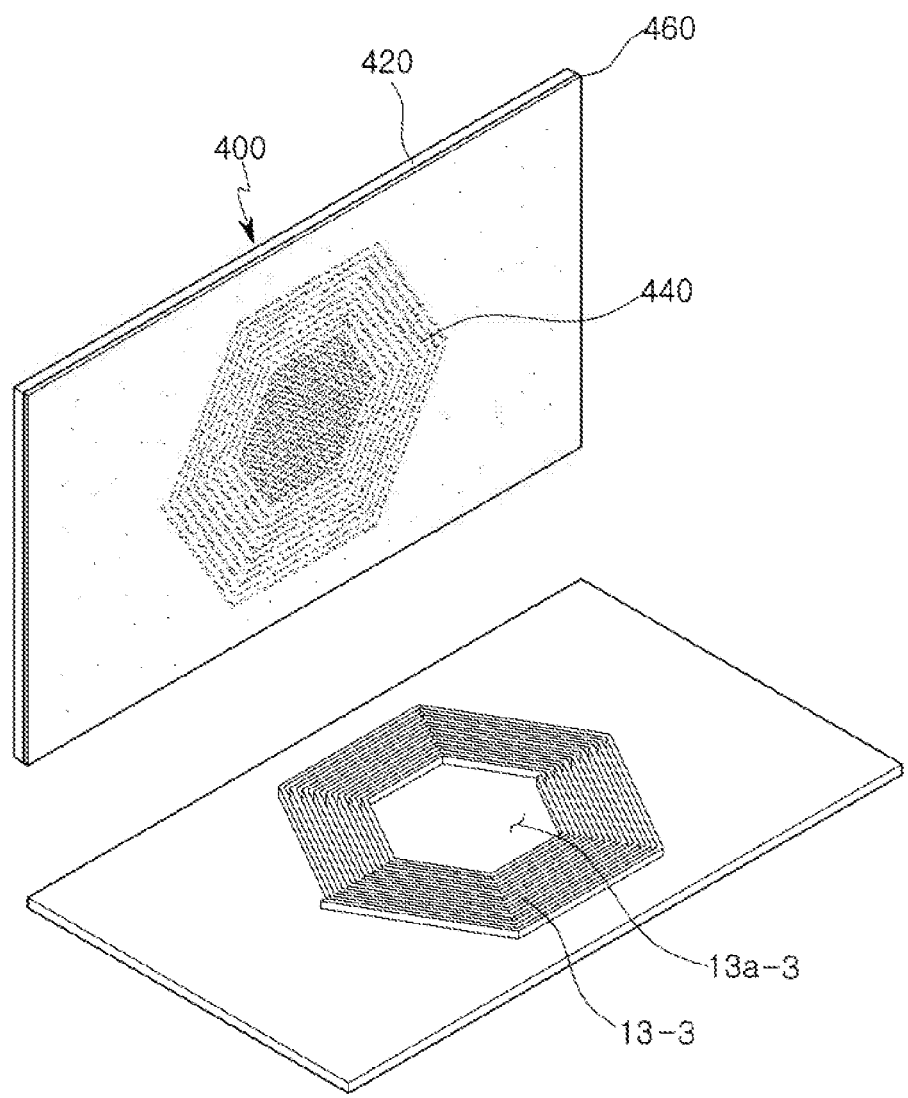

FIGS. 5 through 7 are schematic configuration diagrams illustrating shielding sheets 200, 300, and 400, according to additional embodiments.

As illustrated in FIGS. 5 through 7, positions of regions in which densities of magnetic materials 240, 340, and 440 are high may be variously changed depending on the shapes of respective coils 13-1, 13-2, and 13-3.

In other words, in examples in which the coils 13-1, 13-2, and 13-3 have an ovular spiral shape, a quadrangular spiral shape, and a hexagonal spiral shape, respectively, the regions in which the densities of the respective magnetic materials 240, 340, and 440 are high also have an ovular spiral shape, a quadrangular spiral shape, and a hexagonal spiral shape, respectively.

In addition, densities of the magnetic materials 240, 340, and 440 in inner regions of the ovular spiral shape, the quadrangular spiral shape, and the hexagonal spiral shape, respectively, are higher than those of the magnetic materials 240, 340, and 440 in outer regions of the oval spiral shape, the quadrangular spiral shape, and the hexagonal spiral shape.

Further, the shapes of the coils 13, 13-1, 13-2, and 13-3 are not limited to the shapes described above, and may be modified in various ways.

Figure 8:
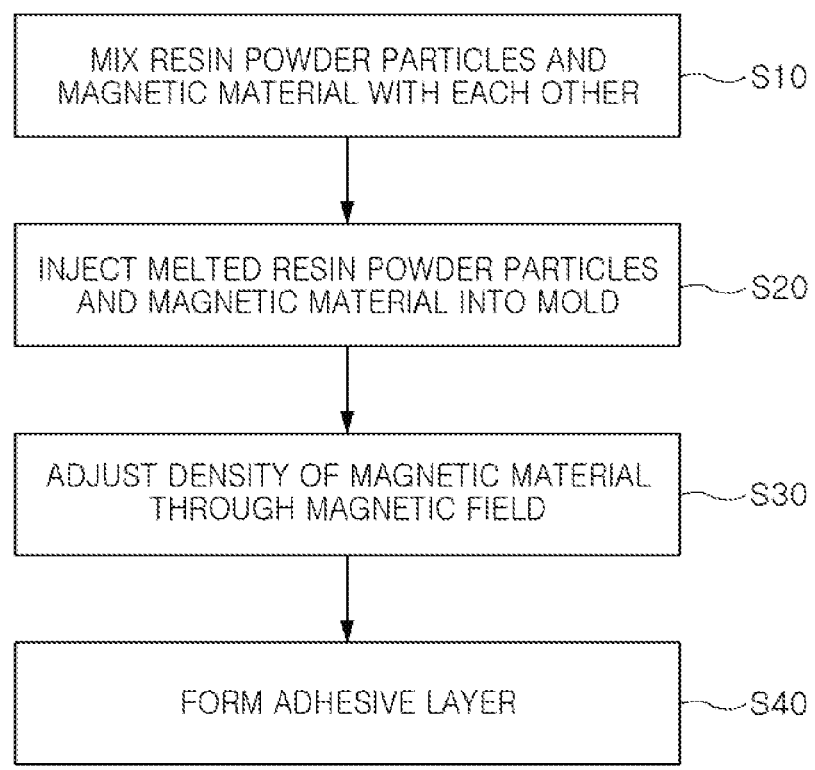
FIG. 8 is a flow chart for describing a method of manufacturing a sheet for shielding electromagnetic waves for wireless charging, according to an embodiment.

FIG. 8 is a flow chart for describing a method of manufacturing a shielding sheet (e.g., shielding sheets 13, 13-1, 13-2, and 13-3), according to an embodiment.

Referring to FIG. 8, resin powder particles are first mixed with a magnetic material in operation S10. The magnetic material may have either one or both of a powder form and a flake form.

In addition, the magnetic material is, for example, an Fe-based or a Co-based magnetic alloy. For example, an Fe—Si—B alloy is used as the Fe-based magnetic alloy, and as a content of metal including Fe in the Fe—Si—B alloy is increased, a saturation magnetic flux density is increased. However, in a case in which a content of Fe elements is excessive, it is difficult to form an amorphous alloy. Therefore, a content of Fe is 70 to 90 atomic %, and when the sum of contents of Si and B is in a range of 10 to 30 atomic %, capability of forming an amorphous alloy is excellent. 20 atomic % or less of a corrosion resistant element such as Cr or Co, is added to the aforementioned basic composition in order to prevent corrosion, and a small amount of other metal elements may be added to the basic composition, if necessary, in order to provide other characteristics.

An Fe-based nanocrystalline magnetic alloy may be used as the nanocrystalline alloy. The Fe-based nanocrystalline magnetic alloy may be an Fe—Si—B—Cu—Nb alloy.

Then, in operation S20, a mixture of the resin, powder particles and the magnetic material is melted and injected into a mold including an internal space having a shape corresponding to a shape of the shielding sheet.

Then, in operation S30, a density of the magnetic material is adjusted by forming a magnetic field through magnets installed in the mold to change a position of the magnetic material.

A density of the magnetic material in a region corresponding to a shape of a coil provided in either one of the transmission coil and the reception coil described above and a region corresponding to an inner side of the coil is higher than a density of the magnetic material in other regions.

In addition, the coil has a spiral shape, and a density of the magnetic material in a region disposed to correspond to a through-hole of the coil is higher than that of the magnetic material in other regions.

In addition, as an example, the coil has a circular spiral shape, and a density of the magnetic material in a region corresponding to the shape of the coil is higher a density that of the magnetic material in a region disposed outside the coil.

Further, there may be a difference in a density of the magnetic material in a thickness direction of the base part in the region corresponding to the shape of the coil. As an example, a density of the magnetic material is higher in a region disposed in an upper portion of the base part disposed adjacent to the coil in the thickness direction of the base part than in a region disposed at a lower portion of the base part.

In addition, a density of the magnetic material in a region corresponding to a region between coil patterns of the coil is lower than a density of the magnetic material in regions corresponding to the coil patterns of the coil.

Further, a disposition shape of the magnetic material is formed depending on magnetic fluxes of magnets disposed in a mold at the time of manufacturing the magnetic material. That is, the disposition shape of the magnetic material may be freely changed by changing positions of the magnets disposed in the mold, the number of magnets, a disposition of the same poles (for example, an N pole and an N pole), a disposition of different poles (for example, an N pole and an S pole), and a magnitude of magnetic force, to change densities of the magnetic fluxes.

Then, in operation S40, the adhesive layer may is formed on one surface of the base part. As an example, the adhesive layer is formed of a generally used adhesive material, for example, a known resin composition, and is formed of a material physically coupled to the base part and forming a chemical bond with the base part.

As described above, the density of the magnetic material of the shielding sheet is changed depending on the shape of the coil to improve shielding efficiency of the magnetic field.

As set forth above, according to the embodiments disclosed herein, the shielding efficiency of the magnetic field is improved.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A sheet to shield electromagnetic waves for wireless charging, comprising:
   a base part; and
   a magnetic material embedded in the base part,
   wherein a density of the magnetic material in a region of the magnetic material corresponding to a shape of a coil of a reception coil member or a transmission coil member and a region of the magnetic material corresponding to an inner side of the coil is higher than a density of the magnetic material in other regions of the magnetic material,
   wherein the coil comprises a spiral shape, and
   wherein a density of the magnetic material in a central region of the magnetic material bounded by a perimeter of a through-hole of the coil is higher than a density of the magnetic material in an outer region of the magnetic material surrounding the central region.

2. The sheet of claim 1, wherein the density of the magnetic material in the region of the magnetic material corresponding to the shape of the coil is higher than a density of the magnetic material in a region of the magnetic material disposed outside the coil.

3. The sheet of claim 1, wherein a density of the magnetic material in a thickness direction of the base part varies in the region of the magnetic material corresponding to the shape of the coil.

4. The sheet of claim 3, wherein a density of the magnetic material in a region of the magnetic material disposed in an upper portion of the base part disposed adjacent to the coil in the thickness direction of the base part is higher than a density of the magnetic material in a region of the magnetic material disposed at a lower portion of the base part.

5. The sheet of claim 1, wherein a density of the magnetic material in a region of the magnetic material corresponding to a region between coil patterns of the coil is lower than a density of the magnetic material in regions of the magnetic material corresponding to the coil patterns.

6. The sheet of claim 1, wherein a disposition shape of the magnetic material is formed based on magnetic fluxes of magnets disposed in a mold at a time of manufacturing the magnetic material.

7. The sheet of claim 1, further comprising an adhesive layer disposed on one surface of the base part.

8. The sheet of claim 1, wherein the magnetic material comprises either one or both of a powder form and a flake form.

9. A wireless power reception apparatus, comprising:
   a base part;
   a wireless power reception coil; and
   a magnetic material embedded in the base part,
   wherein a density of the magnetic material in a region of the magnetic material corresponding to a shape of the wireless power reception coil and a region of the magnetic corresponding to an inner side of the wireless power reception coil is higher than a density of the magnetic material in other regions of the magnetic material,
   wherein the wireless power reception coil comprises a spiral shape, and
   wherein a density of the magnetic material in a central region of the magnetic material bounded by a perimeter of a through-hole of the power reception coil is higher than a density of the magnetic material in an outer region of the magnetic material surrounding the central region.

10. The wireless power reception apparatus of claim 9, wherein the density of the magnetic material in the region of the magnetic material corresponding to the shape of the wireless power reception coil is higher than a density of the magnetic material in a region of the magnetic material disposed outside the wireless power reception coil.

11. The wireless power reception apparatus of claim 9, wherein a density of the magnetic material in a region of the magnetic material disposed in an upper portion of a base part disposed adjacent to the wireless power reception coil in thickness direction of the base part is higher than a density of the magnetic material in a region of the magnetic material disposed at a lower portion of the base part.

* * * * *